Figure 1:
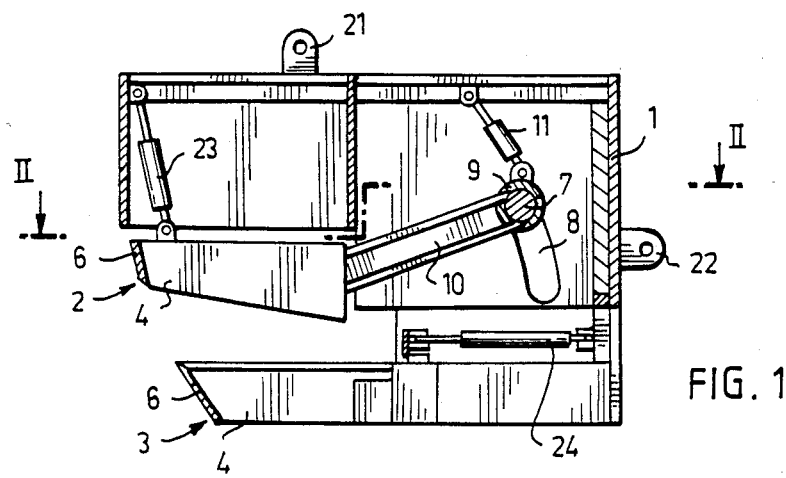

United States Patent [19]

Björkheim

[11] Patent Number: 4,660,451
[45] Date of Patent: Apr. 28, 1987

[54] SCRAP SHEARER

[76] Inventor: Pekka Björkheim, Uudenmaankatu 13 C 55, SF-21200 Turku, Finland

[21] Appl. No.: 777,949

[22] Filed: Sep. 19, 1985

[51] Int. Cl.$^4$ .............................................. B23D 15/06
[52] U.S. Cl. ....................................... 83/527; 83/608; 83/612; 83/928
[58] Field of Search .................. 83/599, 598, 606, 601, 83/608, 612, 928, 917, 527

[56] References Cited

U.S. PATENT DOCUMENTS

| 1,468,228 | 9/1923 | Dobazenecki | 83/599 |
| 4,006,527 | 2/1977 | Sivazhenko | 83/917 X |
| 4,241,631 | 12/1980 | Salvatore | 83/608 X |
| 4,385,538 | 5/1983 | Bieri et al. | 83/608 X |

FOREIGN PATENT DOCUMENTS 463884 4/1937 United Kingdom .................. 83/606

Primary Examiner—Frank T. Yost
Attorney, Agent, or Firm—Ladas & Parry

[57] ABSTRACT

The invention relates to a scrap shearer comprising a displaceable frame (1) and a pair of blade units (2, 3) shearing in a scissor-like manner, whereby the blade units are fastened on the frame (1) so that at least one of the blade units (2, 3) is pivotable. The object of the invention is to provide a scrap shearer which is displaceable to such large scrap objects as e.g. ships and which is capable of advancing within the scrap object, by means of which shearer the requirements of different kinds of scrap objects can be taken into account in the best possible way. This is achieved according to the invention in such a manner that fastening means (7, 8, 11) of the pivotable blade unit (2) are adjustable for the adjustment of the shearing gap and/or angle between the blade units (2, 3).

7 Claims, 3 Drawing Figures

SCRAP SHEARER

The invention relates to a scrap shearer according to the prior art portion of claim 1, especially for such large scrap objects as ships.

Today, breaking up of large steel structures is carried out in practice in such a manner that the object is cut into smaller pieces by means of flame cutting means, which pieces can thereafter be transported away either to be used as raw material in refinining works or to the dump to be further disposed and broken up. This kind of breaking processes require plenty of human labour and are, accordingly, both expensive and slow as well as dangerous to the workers.

For the elimination of these matters, a displaceable scrap shearer is previously known from Finnish Patent Specification No. 791,554, which shearer cuts the scrap object into pieces. The blade units of this shearer comprise two longitudinal blades and a transversal blade which connects said longitudinal blades. One of the blade units of the shearer is stationary, the other being moveable in the upright direction towards said stationary blade. In this known shearer, the blade is controlled by means of guides provided in the frame.

A disadvantage of this shearer, which as such is exellent in breaking up large steel structures, is that when using said shearer, it is not possible to arrange the blades in the best possible way according to the requirements of different kinds of scrap objects, whereby the proceeding of the operation at times needlessly consumes energy and at times the shearer is uncapable of advancing within the object.

A shearer is previously known from, e.g., U.S. Pat. No. 3,752,064 and German Patent Application No. 2,717,620, in which the movement of the blades is effected in a scissor-like manner. These shearers, however, are intended to be permanently fixed in place, the object to be broken up being transported thereto.

So the object of the present invention is to eliminate the disadvantages of previously known solutions and to provide a displaceable shearer, wherein the requirements of each particular scrap object can be taken into account in the best possible way.

These objects are achieved by means of the characteristics of a shearer defined in the characterizing portion of claim 1.

As already stated above, the invention is advantageous in that the shearer can be made suitable for materials of different kinds and different thicknesses simply by adjusting the mutual position of the blades, and it is particularly suitable for breaking up sheet-like objects, because the shearer is capable of advancing along the cutting sheared thereby within the scrap object both in the direction of the length and the width thereof.

Figure 2:
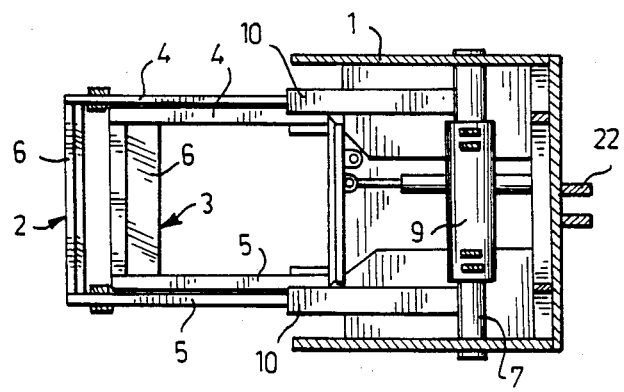
Figure 3:
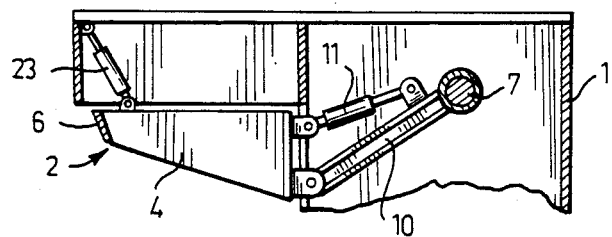

The invention will be described in the following by means of its preferred embodiment with reference to the attached drawing, wherein FIG. 1 is vertical cross-section of a scrap shearer according to the invention, FIG. 2 is a horizontal cross-section of the scrap shearer according to the invention along the line II—II in FIG. 1, and FIG. 3 is a partial vertical cross-section of another preferred solution for adjusting the position of a moveable blade, which solution can be used in the scrap shearer according to the invention.

The reference numeral 1 in FIGS. 1-3 designates a frame which forms the load-bearing structure of the shearer. In these particular examples, the shearer comprises a pair of blades 2, 3 shearing in a scissorlike manner, whereby one blade unit 3 thereof is rigidly fastened on the frame 1 to form a stationary counter blade, the other blade unit 2 of the pair of blades being pivotably fixed on the frame 1. The width of the frame 1 is so dimensioned that the width of the pair of blades 2, 3 exceeds the width of the frame 1 at a point adjacent the shearing gap between said blades, whereby the scrap shearer can advance along the cutting formed thereby within the sheet-like scrap object, for instance.

In the preferred embodiments illustrated in the Figures, each pair of blades is most advantageously formed by two longitudinal blades 4, 5 and a transversal blade 6 connecting said longitudinal blades.

In order to achieve the objects of the invention, i.e. to provide a scrap shearer which can be adapted according to the scrap object in the best possible way in each particular case, the fastening means of the pivotable blade unit 2 of the pair of blades 2, 3 of the shearer shown in FIGS. 1 and 2 are displaceably mounted in the frame 1.

In this particular embodiment, the longitudinal blades 4 of the pivotable blade unit 2 are provided with a blade arm 10 rigidly fastened thereto, which blade arm is journalled on the frame 1 at one end thereof. In this particular case, said journalling is carried out by means of a pivoted axle 7 which is rigidly fixed in said blade arms 10 transversally with respect thereto, the ends of said axle being fitted into guide grooves 8 provided on the frame 1. The pivoted axle 7 is secured inside a stationary supporting sleeve 9 which is fastened on the frame 1 by means of a hydraulic cylinder acting as means 11 for adjusting the position of the pivotable blade unit 2, and further, for supporting the pivoted axle 7 surrounded by said supporting sleeve 9. Said positioning and supporting means 11 can also be formed by any longitudinally adjustable means, such as e.g. a perforated rod which is pivotably fastened at the ends thereof between the supporting sleeve 9 and the frame 1, and which can be locked into a desired position by means of a suitable cotter pin.

The guide groove 8 shown in FIGS. 1 and 2 is preferably an elongated groove extending forwards in a curve in the shearing direction of the shearer through the wall of the frame 1. The width of the groove 8 equals to the diameter of the pivoted axle 7 and the curvature thereof to the distance between the pivoted axle 7 and the transversal blade of the pivotable blade unit, the center of incurvature of the groove being positioned on a line coinciding with the cutting edge of the transversal blade 6 of the stationary blade unit 3. The pivoted axle 7 is displaceable along said guide groove 8 into a desired position by adjusting the length of the positioning means 11.

FIG. 3 illustrates another preferred solution for fastening and positioning of the pivotable blade, by means of which solution a scrap shearer can be provided which can be adapted for different scrap objects in the best possible way. In this particular example, the pivotable blade unit 2 is formed by a blade portion comprising two longitudinal blades 4 and a transversal blade 6 connecting said longitudinal blades, and which blade portion is journalled on the blade arms 10 at the longitudinal blades 4 thereof, which blade arms are mounted on the pivoted axle 7 which is stationarily fixed on the frame 1 for said blade arms 10, said pivoted axle 7 extending transversally with respect to said blade arms 10 and the longitudinal blades 4 mounted thereon. In order to alter the position of the pivotable blade unit 2, thus adjusting the shearing gap and shearing angle between the blade units 2 and 3, the longitudinal blades of the blade unit 2 are connected to the blade arms 10 not only by means of a hinge joint but also by means of longitudinally adjustable positioning means 11', such as e.g. a hydraulic cylinder illustrated in FIG. 3. In this way, it is possible to position the blade units 2 and 3 in the most advantageous way in each particular case.

As regards to the fastening of the pivotable blade unit, it should be mentioned here that the longitudinal blades 4 can be journalled also directly on lugs provided on the frame 1, whereby the position of the lug displaceably connected to the guides on the frame 1 is altered by means of the positioning means 11 in order to adjust the shearing angle and gap between the blade units.

FIGS. 1 and 2 also illustrate displacing lugs 21 and 22 of the shearer, whereby an elevator or the like displacing device which is fastened on said lugs makes it possible to displace the shearer within the scrap object so as to continuously break up said object, which can be a frame of a ship, for example. FIGS. 1 and 2 further illustrate a discharge device for pieces detached by means of the shearer, which device ensures that pieces falling between the blade units of the pair of blades 1, 3 are removed. Said discharge device can be advantageously formed by a pivotably hinged lever 24 which is operated by means of a hydraulic cylinder.

FIGS. 1 and 3 further illustrate means 23 for displacing of the pivotable blade unit. Said means can be formed, as in the case of this example, by a hydraulic cylinder 23, one end of which is pivotably fastened on the lugs positioned on the frame 1, the other end being likewise pivotably fastened on the pivotable blade unit 2. The movement of the blade unit 2 can also be effected by means of a lever arm which is loadable by means of a hydraulic cylinder and rigidly connected to the pivotable blade portion of the pair of blades 2, 3 so as to form an entity which can be moved around the pivoted axle 7 in a swing-like manner.

In the scrap shearer according to the invention, one of the longitudinal blades 5 of preferably the stationary counter blade 3 of one the blade units 2, 3 is sidewardly displaceable. This is due to the fact that when a sheet-like material is cut into pieces, the shearing process effects transformations in the sheet, whereby the dimensions of the cutting formed in the sheet are reduced. If the inner blade unit, which determines the size of the cutting and wherein the outer edge of the longitudinal and transversal blades 4, 5 is positioned against the edges of the cutting formed in the sheet, is stationary, it is not possible for the scrap shearer to advance in the groove which it has formed. As stated above, this disadvantage is eliminated in the scrap shearer according to the invention by means of a sidewardly displaceable longitudinal blade.

The invention is described above merely by means of some of its preferred embodiments. The invention here has by no means been to restrict the invention to apply to these particular examples only, but as it is obvious for one skilled in the art, the invention can be considerably varied within the inventive main idea—a pivotable blade, the position of which is adjustable—which is defined in the accompanying claims. It is further to be mentioned that even if the above description concerns a solution wherein one blade unit is stationary and the other moveable, the invention can also be applied to a shearer wherein both blade units are moveable.

I claim:

1. A scrap shearer arrangement comprising a displaceable frame and a pair of blade units connected to said frame, said blade units shearing in a scissor-like manner, a first of the blade units being stationary, a second blade unit being pivotable about a pivot axle, each said blade unit including two longitudinal blades and a transverse blade connecting said longitudinal blades, the transverse blade of each said blade unit being parallel to the pivot axle of the pivotable blade unit, the width of said frame being dimensioned in a such manner that the width of said blade units exceeds the width of said frame at least at a point adjacent a shearing gap between said blade units to enable the scrap shearer to advance along a cut formed within a sheet-like object.

2. A scrap shearer arrangement according to claim 1, wherein said pivotable blade unit comprises a blade portion and an arm portion which are fixedly interconnected, said blade unit is attached to the frame by means of said arm portion.

3. A scrap shearer comprising a displaceable frame and a pair of blade units connected to said frame, said blade units shearing in a scissor-like manner, a first of the blade units being stationary, a second blade unit being pivotable about a pivot axle, each said blade unit including two longitudinal blades and a transverse blade connecting said longitudinal blades, the transverse blades of both blade units being substantially parallel to the pivot axle of the pivotable blade unit, the width of said frame being dimensioned in a such manner that the width of said blade units exceeds the width of said frame at least at a point adjacent a shearing gap between said blade units to enable the scrap shearer to advance along a cut formed within a sheet-like object and the position of said pivot axle of said pivotable blade unit being adjustable along guides provided on said frame for adjusting the shearing angle and a gap between said blade units.

4. A scrap shearer arrangement according to claim 3, wherein said guides are elongated curved guide grooves, a radius of curvature of said guide grooves substantially equals to the distance between the pivot axle of the pivotable blade unit and the transverse blade of said blade unit.

5. A scrap shearer arrangement according to claim 3, wherein the pivoted axle is rigidly connected to said pivotable blade unit and is rotatable within at least one supporting sleeve, said sleeve being connected to the frame by means of at least one longitudinal adjustable positioning element.

6. A scrap shearer arrangement comprising a displaceable frame and a pair of blade units connected to said frame, said blade units shearing in a scissor-like manner, a first of the blade units being stationary, a second blade unit being pivotable about a pivot axle, each said blade unit including two longitudinal blades and a transverse blade connecting said longitudinal blades, the transverse blades of both blade units being substantially parallel to the pivot axle of the pivotable blade unit, the width of said frame being dimensioned in a such manner that the width of said blade units exceeds the width of said frame at least at a point adjacent a shearing gap between said blade units to enable the scrap shearer to advance along a cut formed within a sheet-like object, said pivotable blade unit comprises a blade portion and an arm portion enabling the arm portion of said pivotable blade unit to be pivotably connected to said frame, said blade portion and said arm portion of said pivotable blade unit being journalled on and adjustable relative to each other by means of a longitudinally adjustable positioning element for adjusting the shearing angle between said blade units.

7. A scrap shearer according to claim 6, wherein said positioning element is a hydraulic cylinder.

* * * * *